United States Patent

[11] 3,616,378

| [72] | Inventors | Forrest N. Case<br>Oak Ridge;<br>David E. Smiley, Knoxville; Donald L. Kau, Rockwood, all of Tenn. |
|---|---|---|
| [21] | Appl. No. | 856,464 |
| [22] | Filed | Sept. 9, 1969 |
| [45] | Patented | Oct. 26, 1971 |
| [73] | Assignee | The United States of America as represented by the United States Atomic Energy Commission |

[54] HIGH-PRESSURE RADIOLYTIC OXIDATION OF CYCLOHEXANE
1 Claim, No Drawings

[52] U.S. Cl. .................................... 204/162 HE, 204/158 HE

[51] Int. Cl. ........................................ B01j 1/10
[50] Field of Search ........................... 204/162 HE, 158

[56] References Cited
UNITED STATES PATENTS
3,099,613  7/1963  Bartok et al. .................. 204/162 HE

*Primary Examiner*—Benjamin R. Padgett
*Attorney*—Roland A. Anderson

ABSTRACT: This invention relates to a method for converting cyclohexane to cyclohexanone which comprises irradiating said cyclohexane with penetrative ionizing radiation at an oxygen pressure which results in a cyclohexanone-to-cyclohexanol product ratio greater than 1.

HIGH-PRESSURE RADIOLYTIC OXIDATION OF CYCLOHEXANE

BACKGROUND OF THE INVENTION

The invention described herein was made in the course of, or under, a contract with the U.S. Atomic Energy Commission.

The present invention relates to an improved process for conducting the radiolytic oxidation of cyclohexane to form cyclohexanone.

Prior to this invention the gamma radiolytic oxidation of liquid cyclohexane with gamma rays or other penetrative ionizing radiation at atmospheric pressure has been extensively studied by several workers, and it has been their substantially uniform finding that cyclohexanol and cyclohexanone are produced in essentially equal amounts on gamma or electron radiolysis of cyclohexane in the liquid state in the presence of oxygen-containing ambient atmospheres. This result has been explained by a mechanism involving the formation of a cyclohexyl-peroxy radical which disproportionates to form cyclohexanol and cyclohexanone. Furthermore, it has been found that the concentration of these products is independent of oxygen concentration in the range aerated to oxygenated solution, where an oxygenated solution is equivalent to an oxygen concentration of about $10^{13}$ molar.

DESCRIPTION OF THE PREFERRED EMBODIMENT

This invention is predicated on the discovery that the ratio of cyclohexanone to cyclohexanol can be enormously increased by conducting the radiolytic oxidation of cyclohexane at high pressures of oxygen of at least 100 and up to as much as 1,000 p.s.i. Under these conditions the controlling reaction mechanism involving scavenging of cyclohexyl radicals by oxygen to produce cyclohexyl-peroxy radicals which subsequently react and disproportionate to give equal amounts of cyclohexanol and cyclohexanone is no longer valid. Radiolysis of cyclohexane under high oxygen pressure not only increases the ratio of ketone to alcohol, but increases the per cent conversion of ketone to a point where it may be favorably compared with standard well-known chemical oxidations of cyclohexane with such oxidizing agents as concentrated nitric acid. In addition, radiolytic oxidation in combination with high oxygen pressure has the additional advantage of reduced oxidation byproducts. That is to say, the reaction is highly specific to producing a ketone or alcohol and any unreacted cyclohexane, as well as cyclohexanol, can be efficiently converted to the desired cyclohexanone product. These advantages lead to the additional advantage that allows, in one embodiment, the continuous removal of cyclohexanone in an enclosed cyclic path while recirculating unreacted cyclohexane and cyclohexanol back to the reaction chamber for further conversion to cyclohexanone. In this mode of operation, the reactants are passed in an enclosed cyclic path from an irradiation chamber to be reacted with a reagent specific for Ketone groups. Examples of such reagents include, but are not limited to, monoalkyl derivatives of ammonia such as hydroxylamine which combine with the ketones in a condensation reaction to produce oximes and derivatives of hydrazine such as phenylhydrazine which yield phenylhydrazone derivatives with cyclohexanone. Thus, according to this invention, the radiation-exposed mixture under suitable pressure of oxygen can be circulated from the radiation zone to or through a bed or column of a ketone-specific reagent which combines with cyclohexanone to remove it from the flowing process stream as a solid reaction product while the effluent stream is recycled back to the radiation zone or chamber for further radiolysis and conversion to the desired cyclohexanone product.

The following examples constitute representative embodiments of this invention which illustrate, among other points, the unexpectedly high yields of cyclohexanone by conducting radiolytic oxidation of cyclohexane under high pressures of oxygen.

EXAMPLE I

Radiolytic oxidation of cyclohexane was conducted in a stainless steel pressure bomb which allowed the cyclohexane to be pressurized with oxygen pressures to 1,500 p.s.i. After the pressure bomb was charged with cyclohexane at a desired oxygen pressure, it was exposed to a cobalt-60 source having a dose rate of $8.5 \times 10^6$ rads/hr. at a reaction temperature ranging from room temperature (about 25° C) to no more than about 38° C. until a desired total gamma dosage had been applied. The irradiation chamber was charged with varying oxygen pressures and irradiated to a total dosage of 34 megarads. The results are summarized in table I below.

TABLE I

Gamma Radiolytic Oxidation of Cyclohexane

| Pressure $O_2$ in p.s.i. | C-% Conversion* Cyclohexanone | G-Yield** Cyclohexanone |
|---|---|---|
| 100 | 2.1 | 6.0 |
| 500 | 3.0 | 8.5 |
| 1,000 | | 13.3 |
| 1,500 | 5.8 | 16.5 |

* All conversions are in weight percent based on weight of starting material

** $G = \dfrac{9.64 \times 10^3 \, C}{MR}$

C = concentration of product in weight percent or percent conversion M = molecular weight of product. R = absorbed does in megarads, $10^6$ rads.

It will be noted that at a constant dosage of 34 megarads the yield of cyclohexanone increased by nearly a factor of 3 by increasing the oxygen pressure from 100 p.s.i. to 1,500 p.s.i., all other conditions remaining constant.

EXAMPLE II

This example is designed to show the effect of radiation dosage at a constant elevated oxygen pressure as it effects the conversion of cyclohexane to cyclohexanone. Radiation of pressurized cyclohexane at an oxygen pressure of 1,500 p.s.i. was conducted in several runs to a total dosage ranging from 4.25 to 153 megarads. The results are summarized in table II below.

TABLE II

Gamma Radiolytic Oxidation of Cyclohexane

Source: Cobalt-60

Dose Rate: $8.5 \times 10^6$ rads/hr.

Reaction Temperature: 36°-38°

$$G = \frac{9.64 \times 10^3 C}{MR}$$

where

C = concentration of product weight % or % conversion;
M = molecular weight;
R = absorbed does in megarads, $10^6$ rads.

Vessel used for irradiations was 500ml. stainless steel pressure bomb with 6.2-cm. inside diameter.

| R-dose in megarads | Pressure $O_2$ in, p.s.i. | C-percent conversion | | |
|---|---|---|---|---|
| | | Cyclohexanol | Cyclohexanone | Adipic acid |
| 4.25 | 1,500 | 0.2 | 0.8 | 0.1 |
| 8.5 | 1,500 | 0.3 | 1.4 | 0.2 |
| 17.0 | 1,500 | 0.5 | 2.6 | 0.4 |
| 34.0 | 1,500 | 0.8 | 4.6 | 0.9 |
| 153.0 | 1,500 | 1.2 | 11.1 | 4.4 |

The data in table II clearly indicate that the amount of cyclohexanone converted at any given dosage far exceeds the amount converted to cyclohexanol.

From the foregoing it will be clear that the major product resulting from the radiolytic oxidation of cyclohexane at high oxygen pressure, i.e., beyond 100 p.s.i. results in a cyclohexanone yield which is several times that of cyclohexanol. It is further clear that the reaction mechanism attributed to radiolytic oxidation reaction of cyclohexane at oxygen pressures equivalent to atmospheric pressure does not describe the dominant mode of reaction present in high-pressure radiolytic oxidation.

In the experimental runs described in the examples, oxidations were carried out in a mechanically static vessel in which the distribution of oxygen was relatively uneven in the reaction liquid. It is clear, therefore, that the oxidation of cyclohexane will be increased by providing means for maximizing the contact of oxygen under pressure with the cyclohexane to improve efficiency, i.e., moles of desired product recovered in relation to the moles of cyclohexane oxidized. Furthermore, with provisions made for removing the desired cyclohexanone product as it is formed, the efficiency will be improved to an even greater degree.

We claim:

1. A method of continuously converting cyclohexane to cyclohexanone which comprises passing cyclohexane pressurized with oxygen at a pressure in the range 100-10,000 p.s.i. around an enclosed process cycle, irradiating said pressurized cyclohexane in a first region of said cycle with penetrating radiation at a temperature in the range 25°–38° C. to convert a portion of said cyclohexane to cyclohexanone, treating the cyclohexanone-containing stream issuing from said first region to a second region where said stream is caused to react with a ketone-specific reagent to remove cyclohexanone from said cycle, continuing to recycle the cyclohexane for further radiation until a desired degree of conversion to ketone is attained.